(12) United States Patent
Fang

(10) Patent No.: US 12,068,446 B2
(45) Date of Patent: Aug. 20, 2024

(54) BATTERY CELL, BATTERY, ELECTRIC APPARATUS, AND MANUFACTURING METHOD OF BATTERY

(71) Applicant: JIANGSU CONTEMPORARY AMPEREX TECHNOLOGY LIMITED, Liyang (CN)

(72) Inventor: Kun Fang, Liyang (CN)

(73) Assignee: JIANGSU CONTEMPORARY AMPEREX TECHNOLOGY LIMITED, Liyang (CN)

(*) Notice: Subject to any disclaimer, the term of this patent is extended or adjusted under 35 U.S.C. 154(b) by 60 days.

(21) Appl. No.: 17/553,071

(22) Filed: Dec. 16, 2021

(65) Prior Publication Data

US 2022/0149421 A1 May 12, 2022

Related U.S. Application Data

(63) Continuation of application No. PCT/CN2021/081053, filed on Mar. 16, 2021.

(30) Foreign Application Priority Data

Nov. 11, 2020 (CN) .......................... 202011249820.6

(51) Int. Cl.
*H01M 10/04* (2006.01)
*H01M 4/04* (2006.01)
(Continued)

(52) U.S. Cl.
CPC .......... *H01M 10/0422* (2013.01); *H01M 4/04* (2013.01); *H01M 4/64* (2013.01); *H01M 10/625* (2015.04); *H01M 50/543* (2021.01)

(58) Field of Classification Search
CPC .......... H01M 10/0422; H01M 10/625; H01M 10/058; H01M 4/04; H01M 4/64;
(Continued)

(56) References Cited

U.S. PATENT DOCUMENTS 7,601,460 B2 10/2009 Hashimoto et al.
7,709,147 B2 5/2010 Sugimoto et al.
(Continued)

FOREIGN PATENT DOCUMENTS

CN 1622364 A 6/2005
CN 101083317 A 12/2007
(Continued)

OTHER PUBLICATIONS

English translation of Uemoto (JP-2004362956-A). (Year: 2004).*
(Continued)

*Primary Examiner* — Jonathan G Leong
*Assistant Examiner* — Drew C Newman
(74) *Attorney, Agent, or Firm* — Scully, Scott, Murphy & Presser, P.C.

(57) ABSTRACT

Disclosed is a battery cell, a battery, an electric apparatus, and a manufacturing method of the battery, belonging to the technical field of batteries. The battery includes an electrode assembly, an electrode terminal and a current collector, the current collector is configured to connect the electrode assembly and the electrode terminal; where the current collector and the electrode terminal are connected through a welding portion; and the welding portion is exposed at an external peripheral surface of the current collector and/or an external peripheral surface of the electrode terminal. The battery cell, the battery, the electric apparatus, and the manufacturing method of the battery are capable of ensuring the safety of the battery.

14 Claims, 12 Drawing Sheets

(51) Int. Cl.
 *H01M 4/64* (2006.01)
 *H01M 10/625* (2014.01)
 *H01M 50/543* (2021.01)

(58) Field of Classification Search
 CPC .... H01M 4/70; H01M 50/543; H01M 50/107; H01M 50/559; H01M 50/566; H01M 50/531; H01M 50/188; H01M 50/213; H01M 50/538; H01M 50/627
 See application file for complete search history.

(56) References Cited

U.S. PATENT DOCUMENTS

| | | | |
|---|---|---|---|
| 10,658,647 | B2 | 5/2020 | Li et al. |
| 2005/0118501 | A1 | 6/2005 | Hashimoto et al. |
| 2009/0104522 | A1 | 4/2009 | Sugimoto et al. |
| 2009/0117459 | A1* | 5/2009 | Hyung ............ H01M 50/3425 429/185 |
| 2009/0197160 | A1 | 8/2009 | Fujiwara et al. |
| 2012/0279053 | A1 | 11/2012 | Kusama et al. |
| 2016/0155998 | A1 | 6/2016 | Wakimoto et al. |
| 2017/0025666 | A1* | 1/2017 | Yamawaki ......... H01M 50/578 |
| 2019/0067663 | A1 | 2/2019 | Li et al. |
| 2020/0203699 | A1 | 6/2020 | Li et al. |

FOREIGN PATENT DOCUMENTS

| | | | |
|---|---|---|---|
| CN | 101180752 | A | 5/2008 |
| CN | 108428824 | A | 8/2018 |
| CN | 112072058 | A | 12/2020 |
| JP | 2004362956 | A * | 12/2004 |
| JP | 2005183360 | A | 7/2005 |
| JP | 2006324180 | A | 11/2006 |
| JP | 2012094250 | A | 5/2012 |
| JP | 2014107147 | A | 6/2014 |
| JP | 2016111012 | A | 6/2016 |
| WO | 2011086673 | A1 | 7/2011 |
| WO | 2013001821 | A1 | 1/2013 |
| WO | 2018062339 | A1 | 4/2018 |

OTHER PUBLICATIONS

Google English translation of Uemoto et al. (JP-2004362956-A) (Year: 2004).*
Extended European Search Report dated Oct. 7, 2022 received in European Patent Application No. EP 21819705.1.
Japanese Office Action dated Feb. 26, 2024 received in Japanese Application No. 2023-503226.

* cited by examiner

Welding a current collector and an electrode terminal from a periphery of the electrode terminal, so that a welding portion of the electrode terminal and the current collector is exposed at an external peripheral surface of the electrode terminal and/or an external peripheral surface of the current collector

FIG. 21

BATTERY CELL, BATTERY, ELECTRIC APPARATUS, AND MANUFACTURING METHOD OF BATTERY

CROSS-REFERENCE TO RELATED APPLICATION

This application is a continuation of International Application No. PCT/CN2021/081053, filed on Mar. 16, 2021, which claims priority to Chinese Patent Application No. 202011249820.6, filed on filed on Nov. 11, 2020. The disclosures of the aforementioned applications are hereby incorporated by reference in their entireties.

TECHNICAL FIELD

The present application relates to the technical field of batteries, and in particular to a battery cell, a battery, an electric apparatus, and a manufacturing method of the battery.

BACKGROUND

It is necessary to weld an electrode terminal with a current collector in the assembly process of a battery, so as to output current collected by the current collector by the electrode terminal.

In related art, the electrode terminal and the current collector are welded unreliably during battery assembly, thereby affecting the safety of the battery.

SUMMARY

An objective of the present application is to provide a battery cell, a battery, an electric apparatus, and a manufacturing method of the battery, thereby improving the safety of the battery.

In a first aspect, a battery cell is provided, including:
an electrode assembly;
an electrode terminal; and
a current collector, configured to connect the electrode assembly and the electrode terminal,
where the current collector and the electrode terminal are connected through a welding portion, and the welding portion is exposed at an external peripheral surface of the current collector and/or an external peripheral surface of the electrode terminal.

In one aspect, in the embodiments of the present application, the current collector and the electrode terminal are welded from the peripheral side surface, the welding operation is convenient. In another aspect, in the embodiments of the present application, welding is performed from a side surface, so that the welding portion does not penetrate through the current collector in a thickness direction, and electrolyte is prevented from leaking from the welding portion. In yet another aspect, the side surface welding manner can ensure the welding quality of the current collector and the electrode terminal, thereby ensuring the battery safety.

In some embodiments, one of the current collector and the electrode terminal is provided with a protrusion; the protrusion is configured to be connected to the other one of the current collector and the electrode terminal, and the protrusion and the external peripheral surface of the other one are connected through a welding portion.

Since one of the current collector and the electrode terminal is provided with the protrusion, the protrusion extends in the thickness direction of the current collector, and the protrusion and the external peripheral surface of the other one are connected through the welding portion. On one hand, the risk of damage to other parts can be reduced; and on the other hand, the welding reliability can be improved, and the welding quality of the current collector and the electrode terminal can be ensured.

In some embodiments, a groove is formed on the external peripheral surface of the other one at one end, and the protrusion is configured to cooperate with the groove.

The groove can cooperate with the protrusion, thereby facilitating the butt welding of the electrode terminal and the current collector at the junction of the groove and the protrusion.

In some embodiments, the protrusion is an annular protrusion, and the annular protrusion is configured to be sleeved on the other one of the current collector and the electrode terminal.

The arrangement of the annular protrusion can ensure the accurate positioning of the current collector and the electrode terminal, thereby facilitating assembling of the current collector and the electrode terminal.

In some embodiments, the current collector includes a first surface and a second surface which are opposite to each other, the protrusion is formed on the first surface, and the second surface is configured to be attached to the electrode assembly.

The protrusion is formed on the first surface so as to be connected to the electrode terminal; and the second surface is configured to be attached to the electrode assembly so as to realize the connection of the current collector, the electrode terminal and the electrode assembly.

In some embodiments, a gap is formed between the electrode terminal and the first surface.

The arrangement of the gap can avoid over-positioning of the welding position of the electrode terminal and the protrusion, or prevent the influence on the welding of the current collector and the electrode terminal by an uneven welding area between the current collector and the electrode assembly.

In some embodiments, the current collector includes a first surface and a second surface which are opposite to each other, a first boss is formed on the first surface, the second surface is attached to the electrode assembly, the protrusion is formed on one surface, close to the current collector, of the electrode terminal, the protrusion is sleeved on the first boss, and the protrusion and the first boss are connected through a welding portion.

The protrusion is formed on one surface, close to the current collector, of the electrode terminal, the protrusion is sleeved on the first boss, and the protrusion extends in the thickness direction of the current collector. On one hand, the risk of damage to other parts can be reduced; and on the other hand, the welding reliability can be improved, and the welding quality of the current collector and the electrode terminal can be ensured. In some embodiments, the first boss is an annular boss.

The design of the annular boss can reduce the weight of the current collector.

In some embodiments, the battery further includes: an end cover, mounted on the electrode terminal; and an insulating piece, at least partially arranged between the end cover and the electrode terminal, the insulating piece extends between the end cover and the current collector, and is configured to isolate the end cover from the electrode terminal.

The arrangement of the insulating piece can realize isolation of the electrode terminal from the end cover.

In some embodiments, second bosses are formed on one side, towards the electrode assembly, of the insulating piece, the second bosses are configured to abut against the electrode assembly, a plurality of second bosses are arranged at the periphery of the current collector at intervals, and a clearance portion is formed between the two adjacent second bosses.

The arrangement of the second bosses can prevent the electrode assembly from shaking; and the arrangement of the clearance portion between the second bosses facilitates welding between the current collector and the electrode terminal.

In some embodiments, a notch is formed at an edge of the current collector, and at least one of the second bosses is clamped with the notch to limit rotation of the current collector.

The arrangement of the notch facilitates cooperation between the current collector and the second bosses so as to prevent rotation of the electrode terminal.

In some embodiments, the end cover is provided with a first liquid injection hole; an avoiding groove is formed on an end face of one of the second bosses, the avoiding groove extends to an external peripheral surface of the second bosses, a second liquid injection hole is formed on a bottom surface of avoiding groove, and the second liquid injection hole communicates with the first liquid injection hole.

The arrangement of the first liquid injection hole and the second liquid injection hole can realize injection of electrolyte; and the arrangement of the avoiding groove facilitates smooth flowing of the electrolyte.

In a second aspect, a battery is provided, including the above batter cell.

In a third aspect, an electric apparatus is provided, including the above battery.

In a fourth aspect, a manufacturing method of a battery is provided. The manufacturing method of the battery includes: welding a current collector and an electrode terminal from a periphery of the electrode terminal, so that a welding portion of the electrode terminal and the current collector is exposed at an external peripheral surface of the electrode terminal and/or an external peripheral surface of the current collector.

BRIEF DESCRIPTION OF DRAWINGS

In order to describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may also derive other drawings from these accompanying drawings without creative efforts.

FIG. 21 is a flowchart view of a manufacturing method of a battery cell provided by an embodiment of the present application.

Figure 1:
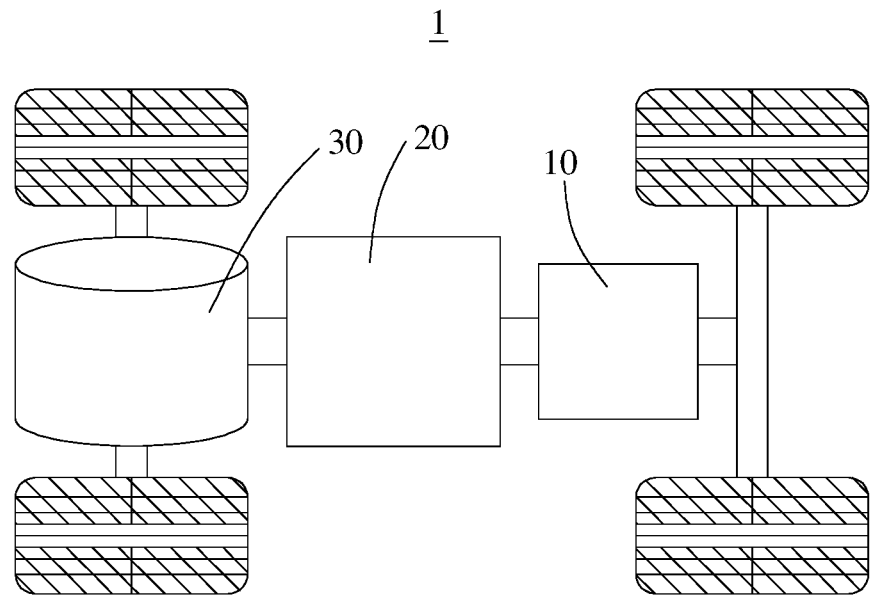
FIG. 1 is a schematic diagram of a vehicle provided by an embodiment of the present application.

In the accompanying drawings, the accompanying drawings are not drawn according to an actual ratio.

Description of reference numerals: 1—vehicle; 10—battery; 101—box body; 102—upper cover; 100—battery cell; 110—shell; 111—accommodating space; 120—electrode assembly; 121—main body portion; 122—tab; 130—electrode terminal; 131—terminal body; 132—terminal pedestal; 133—limiting portion; 140—current collector; 141—first surface;

142—second surface; 143—first boss; 144—notch; 150—end cover; 151—through hole; 152—first liquid injection hole; 160—insulating piece; 161—first insulating piece; 162—second insulating piece; 1621—insulator; 1622—sealing body; 163—recessed portion; 164, 164a, 164b—second boss; 1641—avoiding groove; 1642—second liquid injection hole; 165—clearance portion; 170—welding portion; 181—protrusion; 182—groove; 183—gap; 190—external adapter; 20—controller; 30—motor.

DESCRIPTION OF EMBODIMENTS

In order to make the objectives, technical solutions and advantages of the embodiments of the present application clearer, the technical solutions in the embodiments of the present application are described below clearly and completely with reference to the accompanying drawings in the embodiments of the present application. Apparently, the described embodiments are some rather than all of the embodiments. Generally, components of the embodiments of the present application described and shown in the accompanying drawings may be arranged and designed in various different configurations.

Therefore, the following detailed description of the embodiments of the present application in the accompanying drawings is not intended to limit the protection scope of the present application, but merely represent selected embodiments of the present application. All other embodiments obtained by those of ordinary skill in the art based on the embodiments in the present application without creative efforts should fall within the protection scope of the present application.

It should be noted that similar reference numerals and letters represent similar items in the accompanying drawings below. Therefore, once an item is defined in one drawing, it does not need to be further defined and described in subsequent drawings.

In the description of the present application, it should be noted that the orientation or position relationship indicated by terms "inner", "outer" and the like is an orientation or position relationship shown in the drawings, or an orientation or position relationship that a product of the present application is usually placed during use, which is only for the convenience of describing the present application and simplifying the description, but does not indicate or imply that the referred devices or elements must have a specific orientation and be configured and operated in a specific orientation, so it cannot be understood as a limitation to the present application. In addition, the terms such as "first", "second" and the like are used only for distinguishing the description and cannot be understood to indicate or imply relative importance.

In the description of the present application, it should also be noted that unless otherwise specified and limited, the terms "set" and "connect" should be understood in a broad sense. For example, they may be fixed connection, detachable connection or integrated connection, may be direct connection, may also be indirect connection implemented by an intermediate medium, and may be internal communication of two elements. A person of ordinary skill in the art may understand specific meanings of the above-mentioned terms in the present application based on the specific situation.

In the present application, the term "and/or" merely describes the association relationship between the associated objects and indicates that there may be three relationships. For example, A and/or B may indicate three cases where only A exists, A and B exist at the same time, or only B exists. In addition, the character "/" in the present application generally indicates that the associated objects are in an "or" relationship.

The battery mentioned in the embodiments of the present application may include a lithium ion secondary battery, a lithium ion primary battery, a lithium sulfur battery, a sodium lithium ion battery, a sodium ion battery or a magnesium ion battery. The embodiments of the present application are not limited to this. The battery may be of a cylinder, a flat body, a cuboid or other shapes, which is not limited by the embodiments of the present application. The battery is generally divided into three types according to packaging methods: a cylindrical battery, a square battery and a soft package battery.

The battery described in the embodiments of the present application is applied to various devices using batteries, such as a mobile phone, a portable device, a notebook computer, a storage battery car, an electromobile, a ship, a spacecraft, an electric toy, an electric tool and the like. For example, the spacecraft includes an airplane, a rocket, a space shuttle, a spaceship and the like. The electric toy includes a fixed or mobile electric toy, such as a game machine, an electromobile toy, an electric ship toy and an electric airplane toy. The electric tool includes an electric tool for metal cutting, an electric tool for grinding, an electric tool for assembling and an electric tool for railways, such as an electric drill, an electric grinding machine, an electric wrench, an electric screw driver, an electric hammer, an electric impact drill, a concrete vibrator and an electric planer.

It should be understood that the technical solutions described in the embodiments of the present application are not only suitable for the above described device, but also suitable for all devices using the battery. However, for simple description, the following embodiments are described by taking the electric vehicle as an example.

For example, as shown in FIG. 1, it is a structural schematic diagram of a vehicle 1 in an embodiment of the present application. The vehicle 1 can be a fuel vehicle, a gas vehicle or a new energy vehicle, and the new energy vehicle can be a battery electric vehicle, a hybrid electric vehicle or an extended-range vehicle. As shown in FIG. 1, the interior of the vehicle 1 can be equipped with a battery 10. For example, the battery 10 can be arranged at the bottom or head or tail of the vehicle 1. The battery 10 can be configured to supply power for the vehicle. For example, the battery 10 may serve as an operating power supply of the vehicle 1. In addition, the vehicle 1 may further include a controller 20 and a motor 30. The controller 20 is configured to control the battery 10 to supply power for the motor 30, for example, for the working electricity demand of the vehicle 1 during starting, navigation and driving. In another embodiment of the present application, the battery 10 not only may serve as an operating power supply of the vehicle 1, but also may serve as a driving power supply of the vehicle 1 to replace or partially replace fuel oil or natural gas to provide driving power for the vehicle 1.

Figure 2:
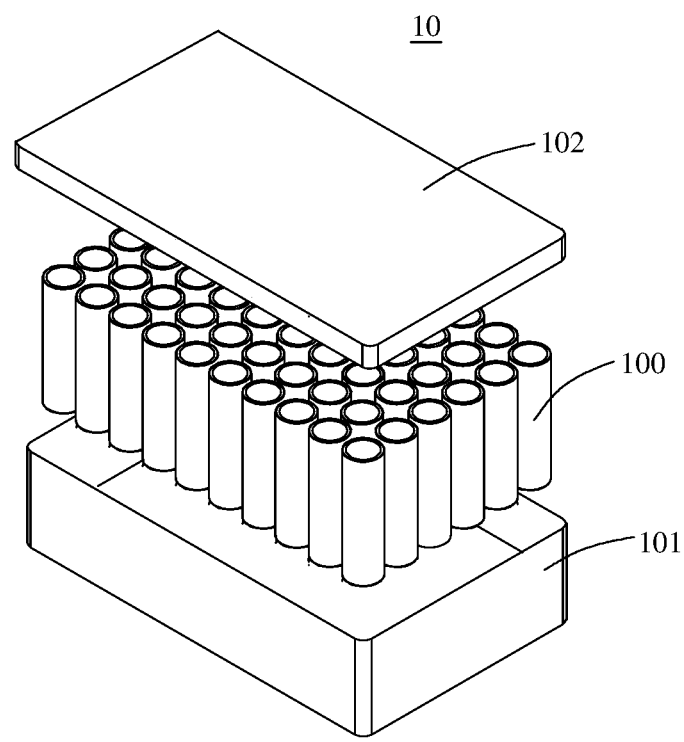
FIG. 2 is a structural schematic diagram of a battery provided by an embodiment of the present application.

For example, as shown in FIG. 2, it is a structural schematic diagram of a battery 10 in an embodiment of the present application. The battery 10 includes a box body 101, an upper cover 102 and a plurality of battery cells 100. The plurality of battery cells 100 are accommodated in the box body 101, and the upper cover 102 is fastened to an opening of the box body 101 to close the opening of the box body 101. For example, FIG. 3 is an example of a battery cell 100.

The battery 10 may further include a confluence part (not shown in the figure), and the confluence part is configured to realize the electric connection among a plurality of battery cells 100, such as parallel connection or series connection or parallel-series connection. Specifically, the confluence part may realize electric connection among the battery cells 100 by connecting to the electrode terminal of the battery cell 100. The confluence part may be fixed on the electrode terminal of the battery cell 100 through welding. Electric energy of the plurality of batter cells 100 may further pass through a conductive mechanism (not shown in the figure) and pass through the box body 101 to be led out.

According to different electricity requirements, the number of the battery cells 100 can be set to any value. The plurality of battery cells 100 can be connected in series, in parallel or in series-parallel to achieve higher capacity or power.

Figure 3:
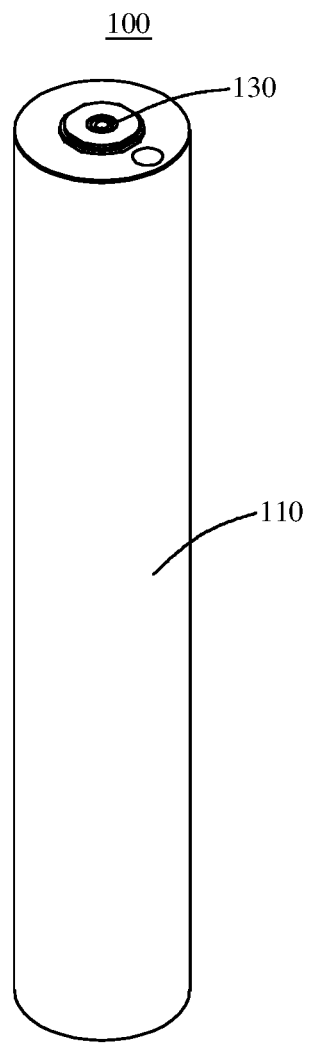
FIG. 3 is an assembling diagram of a battery cell provided by an embodiment of the present application.
Figure 4:
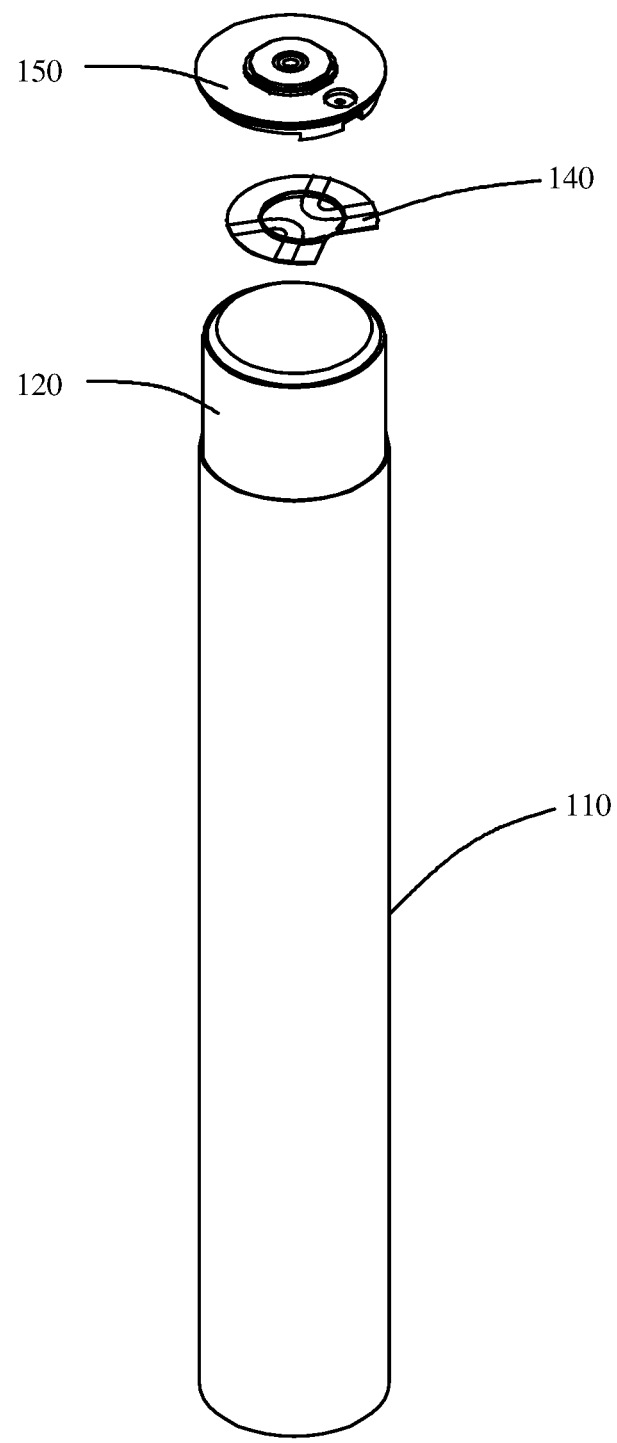
FIG. 4 is an exploded view of a battery cell provided by an embodiment of the present application.

In some embodiments, as shown in FIG. 3 and FIG. 4, the battery cell 100 is a cylindrical battery. In other embodiments of the present application, the battery cell 100 may also be a square battery.

Figure 5:
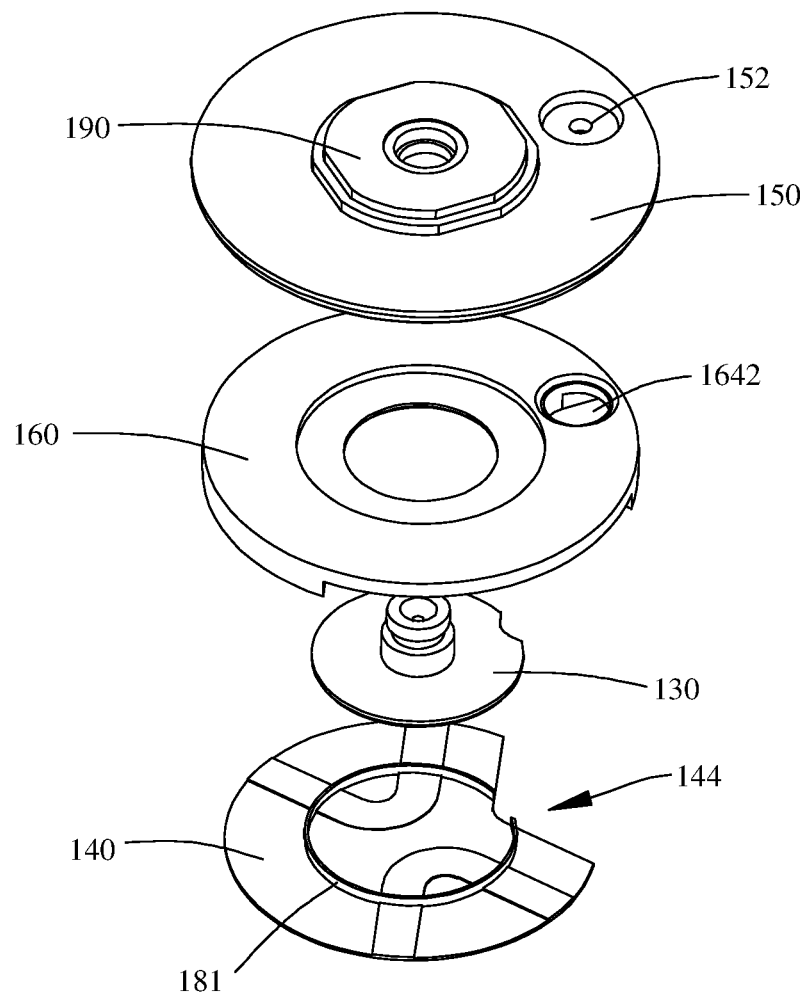
FIG. 5 is an exploded view of an end part assembly of a battery cell provided by an embodiment of the present application.

Referring to FIG. 4 and FIG. 5, the battery cell 100 includes a shell 110, an electrode assembly 120, an electrode terminal 130, a current collector 140, an end cover 150 and an insulating piece 160. The electrode assembly 120 includes a positive plate, a negative plate and an isolating membrane. The positive electrode plate includes a positive current collector and a positive active substance layer, the positive active material layer is coated on a surface of the positive current collector, the current collector uncoated with the positive active material layer protrudes out of the current collector coated with the positive active material layer, and the current collector uncoated with the positive electrode active material layer serves as a positive electrode tab. Taking the lithium-ion battery as an example, the positive current collector can be made of aluminum, and the positive active material can be lithium cobalt oxide, lithium iron phosphate, ternary lithium, or lithium manganate. The negative plate comprises a negative current collector and a negative active material layer, the negative active material layer is coated on a surface of the negative current collector, and the current collector uncoated with the negative active material layer protrudes out of the current collector coated with the negative active material layer, and the current collector uncoated with the negative electrode active material layer serves as a negative electrode tab. The negative current collector can be made of copper, and the negative active material can be carbon or silicon. To guarantee that no fusing occurs while a large current passes through, a plurality of positive electrode tabs are stacked together, and a plurality of negative electrode tabs are stacked together. The separator can be made of PP, or PE, and the like. In addition, the electrode assembly can be a wound structure or can be a laminated structure, and embodiments of the present application are not limited thereto.

Figure 6:
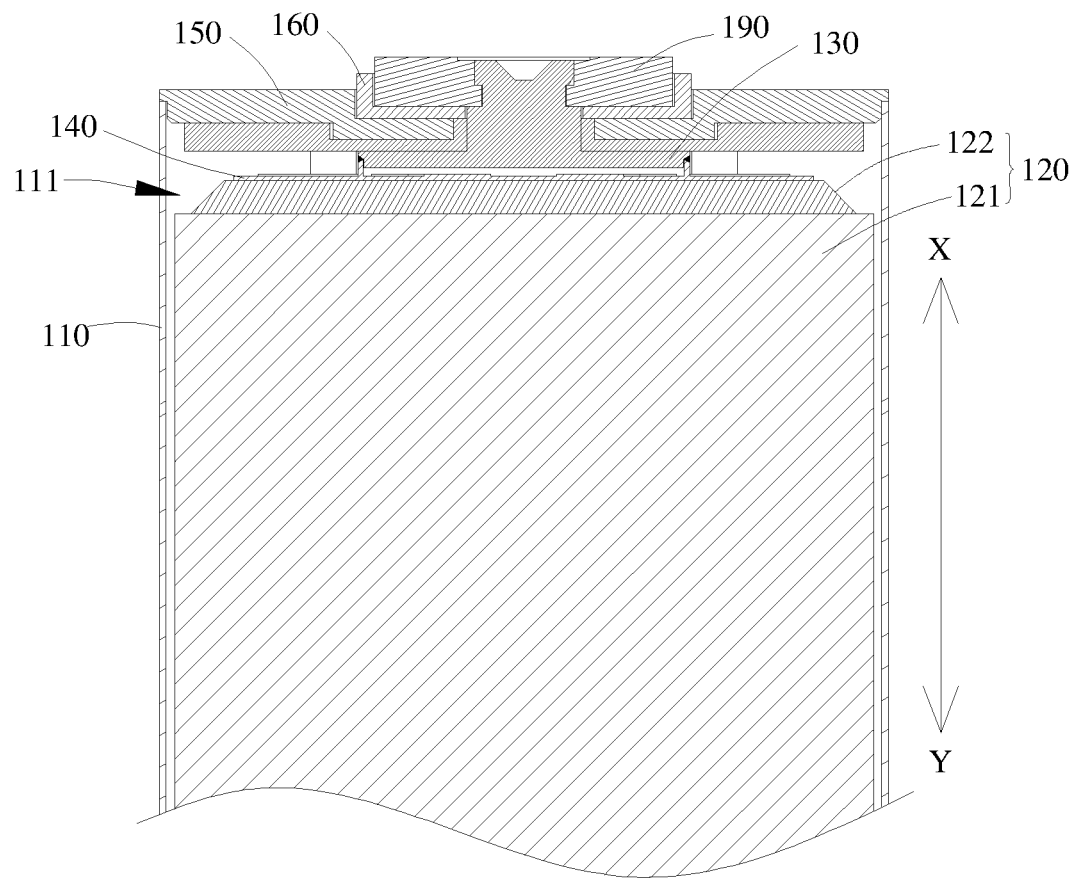
FIG. 6 is a schematic diagram of a partial section structure of a battery cell provided by an embodiment of the present application.

As shown in FIG. 6, the shell 110 is provided with an accommodating space 111 for accommodating the electrode assembly 120, and the electrode assembly 120 is configured to be accommodated in the shell 110. As shown in FIG. 4 and FIG. 6, the electrode terminal 130, the end cover 150 and the insulating piece 160 are assembled integrally and form an end part assembly, and the end cover 150 is configured to seal an opening at one end of the shell 110; as shown in FIG. 5 and FIG. 6, the insulating piece 160 is arranged between the end cover 150 and the electrode terminal 130 and is configured to electrically insulate the end cover 150 and the electrode terminal 130. As shown in FIG. 6, the current collector 140 is configured to connect the electrode assembly 120 and the electrode terminal 130, and the electrode terminal 130 is configured to output electric energy.

As shown in FIG. 6, the electrode assembly 120 includes a main body portion 121 and a tab 122, and the tab 122 is located on an end part of the main body portion 121 in a thickness direction of the end cover 150. For example, as shown in FIG. 4 and FIG. 6, the battery cell 100 is a cylindrical batter cell, the main body portion 121 is provided with two end parts, each end part is provided with a tab 122, each tab 122 corresponds to each current collector 140, and the current collector 140 is welded with the corresponding tab 122.

Figure 7:
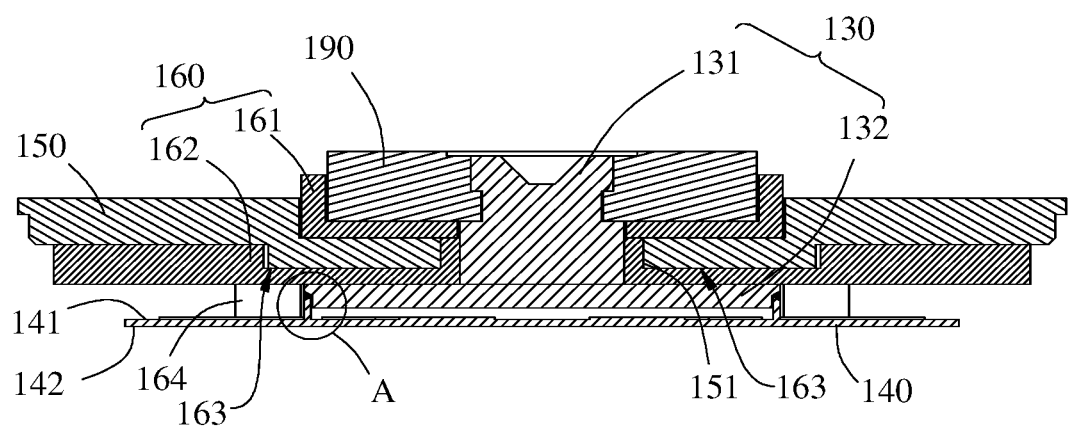
FIG. 7 is an assembling schematic diagram of an end part assembly and a current collector provided by an embodiment of the present application.
Figure 8:
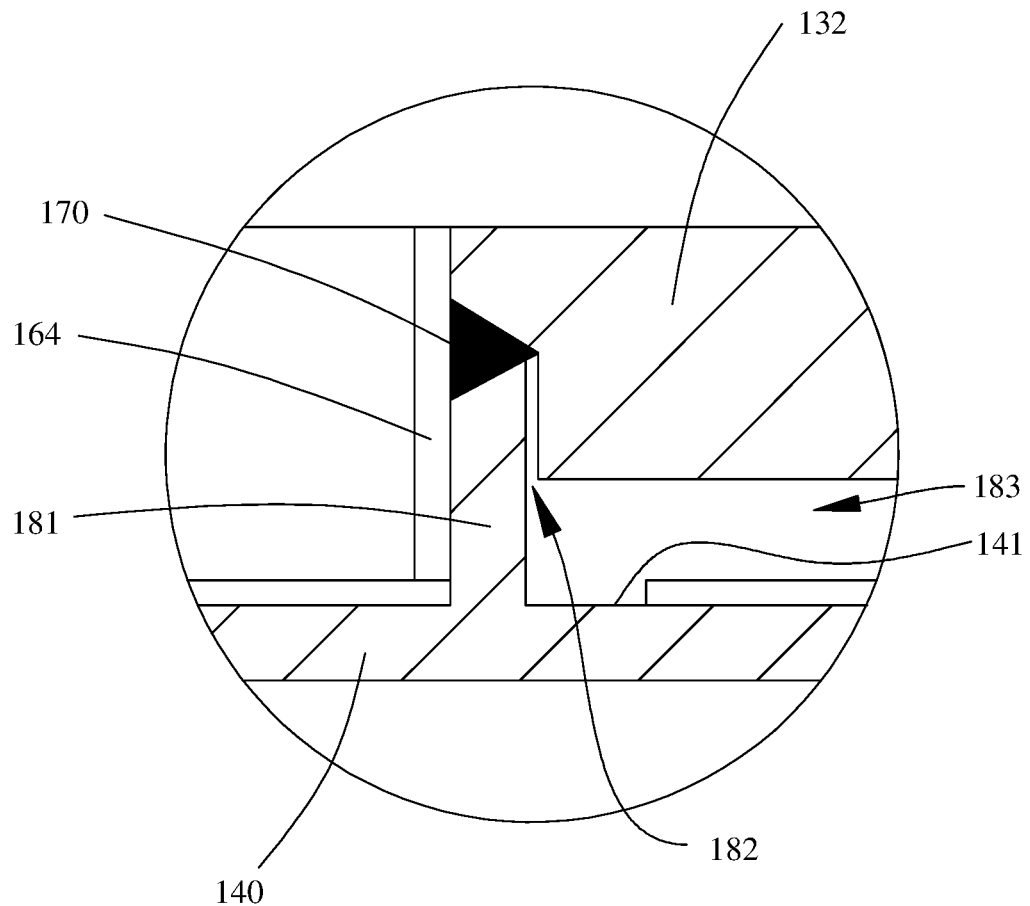
FIG. 8 is an enlarged view of a position A in FIG. 7.

In some embodiments, as shown in FIG. 7 and FIG. 8, the current collector 140 and the electrode terminal 130 are connected through a welding portion 170, and the welding portion 170 is exposed at external peripheral surfaces of the current collector 140 and the electrode terminal 130. That is, the current collector 140 and the electrode terminal 130 may be butt welded at the external peripheral surfaces of the current collector 140 and the electrode terminal 130, and at this time, the welding portion 170 is exposed at the external peripheral surfaces of the current collector 140 and the electrode terminal 130.

It should be noted that in the embodiments of the present application, the end cover assembly, the current collector 140 and the electrode assembly 120 are arranged sequentially in the preset direction, and the thickness direction of the current collector 140 and the thickness direction of the end cover 150 are consistent with the preset direction; the external peripheral surface refers to a surface of an object in a direction perpendicular to the thickness direction of the current collector 140, or the external peripheral surface refers to a surface of an object in a circumferential direction, or the external peripheral surface refers to a side surface of an object, or the external peripheral surface refers to a side surface of an object in a circumferential direction, or the external peripheral surface refers to an outer side surface of an object. For example, the external peripheral surface of the current collector 140 is a surface of the current collector 140 in a circumferential direction, namely, a side surface of the current collector 140, which may be understood as a surface of the current collector 140 in a direction perpendicular to the thickness of the current collector 140; and the electrode terminal 130 may be understood as a revolving body, a revolving center line of the electrode terminal 130 extends along the preset direction (the thickness direction of the current collector 140), the external peripheral surface of the electrode terminal 130 is a surface of the electrode terminal 130 in the circumferential direction, namely a side surface of the electrode terminal 130, which may be understood as a surface of the electrode terminal 130 in a direction perpendicular to the revolving center line of the electrode terminal 130.

In one aspect, in the embodiments of the present application, the current collector 140 and the electrode terminal 130 are welded from the peripheral side surface, and the welding operation is convenient. In another aspect, in the embodiments of the present application, welding is performed from a side surface, so that the welding portion 170 does not penetrate through the current collector 140 in the thickness direction, and electrolyte is prevented from leaking from the welding portion 170. In yet another aspect, the side surface welding manner can ensure the welding quality of the current collector 140 and the electrode terminal 130, thereby ensuring the battery safety.

It should be noted that the welding portion 170 may be understood as a weld joint. The weld joint is a joint formed by melting and connecting metal at the joint by using the high temperature of a welding heat source, and is an entity. Welding may adopt laser welding, soldering and the like. As shown in FIG. 6, the X-Y direction in the figure is the thickness direction of the current collector, short for thickness direction. The welding portion 170 may be understood as a weld joint which is formed by welding at the external peripheral surface of the current collector 140 and/or an external peripheral surface of the electrode terminal 130 in a direction perpendicular to the thickness direction of the current collector 140.

In order to facilitate the assembling of the end cover 150 and the electrode terminal 130 and the output of electric energy, the end cover 150 is sleeved outside the electrode terminal 130, and part of the electrode terminal 130 is protruded out of the end cover 150.

In some embodiments, as shown in FIG. 7, the electrode terminal 130 includes a terminal body 131 and a terminal pedestal 132, and one end of the terminal body 131 and the terminal pedestal 132 are connected or integrally formed; the terminal pedestal 132 is configured to be connected to the current collector 140; and the terminal body 131 is configured to be connected to the confluence part to lead out the electric energy.

In some embodiments, as shown in FIG. 7, the terminal body 131 is of a columnar structure, the terminal pedestal 132 is of a disk-shaped structure, and a diameter of the terminal pedestal 132 is greater than a diameter of the terminal body 131. In other embodiments, the terminal body 131 and the terminal pedestal 132 may be of other appropriate structures.

In some embodiments, as shown in FIG. 5, FIG. 6 and FIG. 7, the battery cell 100 further includes an external adapter 190, the external adapter 190 is connected to one end of the electrode terminal 130 away from the current collector 140, and the external adapter 190 is electrically insulated from the end cover 150 through the insulating piece 160. As shown in FIG. 7, the external adapter 190 is sleeved on an external peripheral surface of the terminal body 131, the external adapter 190 is located on one side of the end cover 150 away from the current collector 140, and the external adapter 190 cooperates with the terminal pedestal 132 and the terminal body 131 to clamp the insulating piece 160 and the end cover 150 between the external adapter 190 and the terminal pedestal 132. The arrangement of the external adapter 190 increases the connection area of electric energy output so as to facilitate connection with the confluence part.

In some embodiments, as shown in FIG. 7, the current collector 140 includes a protrusion 181, the protrusion 181 is configured to be connected to the electrode terminal 130, and an external peripheral surface of the protrusion 181 and the external peripheral surface of the electrode terminal 130 are connected through the welding portion 170. The protrusion 181 is protruded towards the electrode terminal 130 in the thickness direction of the current collector 140. Due to the arrangement of the protrusion 181, on one hand, the risk of damage to other parts can be reduced; and on the other hand, the welding reliability can be improved, and the welding quality of the current collector 140 and the electrode terminal 130 can be ensured.

It should be noted that the external peripheral surface of the protrusion 181 is a side surface of the protrusion 181, which may be understood as a surface of the protrusion 181 in a direction perpendicular to the preset direction. When the protrusion 181 is formed on the current collector 140, the side surface of the protrusion 181 may be understood as the external peripheral surface of the current collector 140.

In some embodiments, as shown in FIG. 7, the current collector 140 includes a first surface 141 and a second surface 142 which are opposite to each other, the first surface 141 faces towards the electrode terminal 130, and the second surface 142 is configured to be attached to the electrode assembly 120. The second surface 142 of the current collector 140 is attached to the electrode assembly 120, so that the welding reliability of the current collector 140 and the electrode assembly 120 is improved or enhanced, and the problems that temperature distribution is uneven and the local temperature rise is too high are improved. The protrusion 181 is formed on the first surface 141, and the protrusion 181 is protruded towards the electrode terminal 130 from the first surface 141 in the thickness direction of the current collector 140.

In some embodiments, as shown in FIG. 7 and FIG. 8, a groove 182 is formed at an external peripheral surface of the terminal pedestal 132, the protrusion 181 is configured to cooperate with the groove 182, and the protrusion 181 is configured to be inserted into the groove 182. It can be understood that the groove 182 extends in the circumferential direction of the terminal pedestal 132. The groove 182 can cooperate with the protrusion 181, thereby facilitating butt welding of the electrode terminal 130 and the current collector 140 at the joint of the groove 182 and the protrusion 181, the external peripheral surface of the protrusion 181 and the external peripheral surface of the electrode terminal 130 are connected through the welding portion 170, and the welding portion 170 is exposed at the external peripheral surfaces of the electrode terminal 130 and the current collector 140. It may also be understood that the welding portion 170 is exposed at the external peripheral surface of the protrusion 181.

In some embodiments, as shown in FIG. 7 and FIG. 8, a gap 183 is formed between an end face of the electrode terminal 130 facing towards the current collector 140 and the first surface 141. The arrangement of the gap 183 can prevent the end face of the electrode terminal 130 abutting against the first surface 141, otherwise it and positioning that the protrusion 181 abuts against the groove bottom of the groove 182 form repositioning. Or the arrangement of the gap 183 can prevent the influence on the welding between the current collector 140 and the electrode terminal 130 caused by an uneven welding area of the current collector 140 and the electrode assembly.

In some embodiments, as shown in FIG. 7, at least part of the insulating piece 160 is arranged between the end cover 150 and the electrode terminal 130, and part of the insulating piece 160 extends between the end cover 150 and the current collector 140 for isolating the end cover 150 from the electrode terminal 130.

In some embodiments, as shown in FIG. 7, the insulating piece 160 includes a first insulating piece 161 and a second insulating piece 162. The first insulating piece 161 is sleeved on the external peripheral surface of the terminal body 131 and is located on one side of the end cover 150 away from the current collector 140. The first insulating piece 161 is arranged between the end cover 150 and the electrode terminal 130. The second insulating piece 162 is sleeved on the external peripheral surface of the terminal body 131 and is located on one side of the end cover 150 facing towards the current collector 140, and the end cover 150 is located between the second insulating piece 162 and the first insulating piece 161; and the second insulating piece 162 is located between the end cover 150 and the terminal pedestal 132 and extends between the end cover 150 and the current collector 140.

In some embodiments, as shown in FIG. 7, a recessed portion 163 for cooperating with the end cover 150 is formed on the second insulating piece 162, and the recessed portion 163 is of an annular structure; and part of the end cover 150 is configured to be embedded in the recessed portion 163, a middle part of the end cover 150 is provided with a through hole 151 cooperating with the second insulating piece 162, and part of the second insulating piece 162 penetrates into the through hole 151 so as to isolate the end cover 150 from the terminal body 131. The arrangement of the recessed portion 163 reasonably utilizes a mounting space, so that the external adapter 190 is closer to the current collector 140 in the thickness of the current collector 140, thereby reducing the height of the battery cell 100 and increasing the energy density of the battery cell 100.

The first insulating piece 161 and the second insulating piece 162 may be two independent parts, and may also be integrally formed. When the first insulating piece 161 and the second insulating piece 162 are integrally formed, the insulating piece 160 can be deformed to facilitate assembling when being assembled with the electrode terminal 130 and the end cover 150. Meanwhile, the insulating piece 160 and the electrode terminal 130 are assembled in a sealed fit. In one embodiment, the first insulating piece 161 and the second insulating piece 162 are two independent parts, thereby facilitating the assembling of the end cover 150 and the electrode terminal 130.

Figure 9:
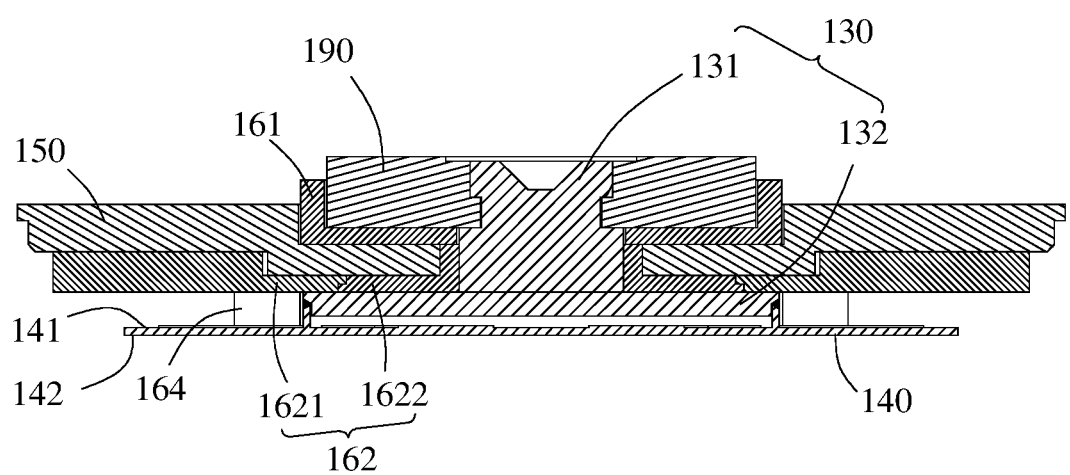
FIG. 9 is an assembling schematic diagram of an end part assembly and a current collector provided by another embodiment of the present application.

In some embodiments, the first insulating piece 161 and the second insulating piece 162 are two independent parts. In order to ensure the sealed fit of the insulating piece 160 and the electrode terminal 130, as shown in FIG. 9, the second insulating piece 162 includes an insulator 1621 and a sealing body 1622, and the insulator 1621 and the sealing body 1622 are two independent parts. The sealing body 1622 is sleeved on the external peripheral surface of the terminal body 131, and the insulator 1621 and the end cover 150 is sleeved on an external peripheral surface of the sealing body 1622, so that the end cover 150 hermetically cooperates with the electrode terminal 130.

Figure 10:
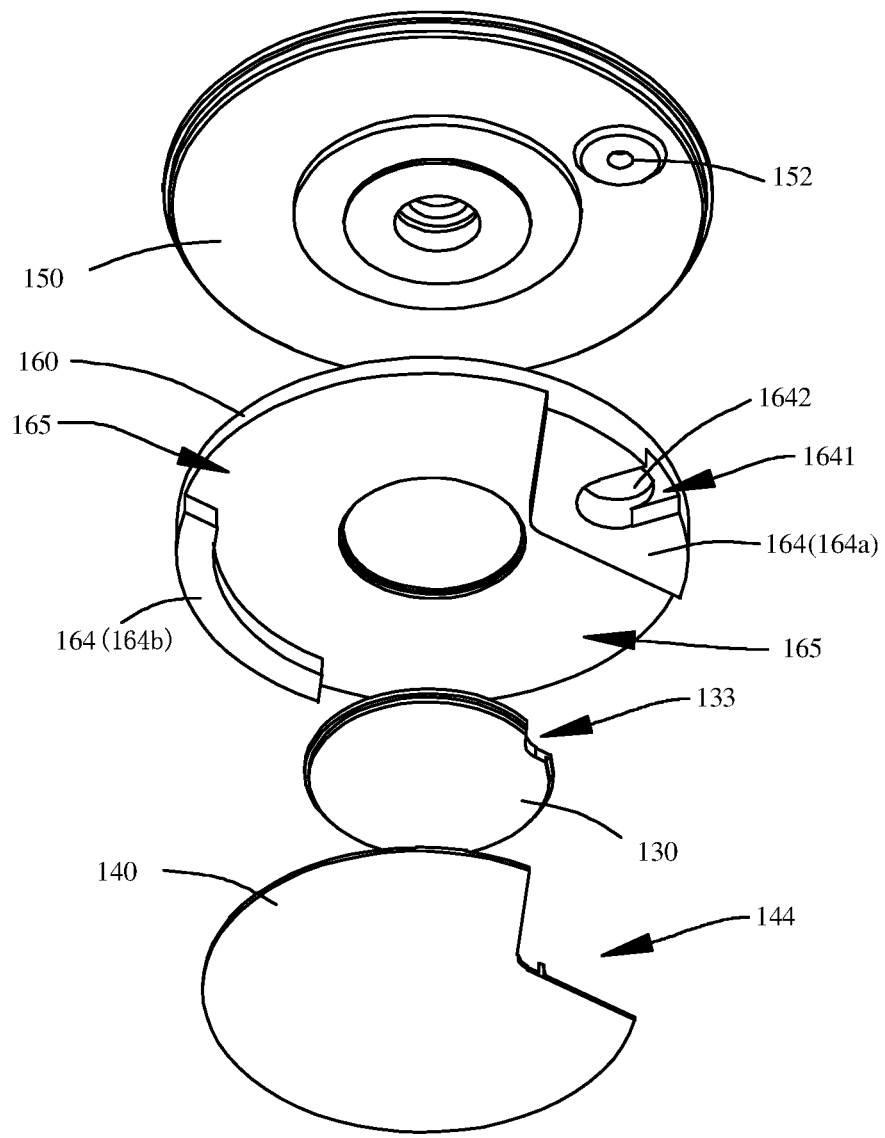
FIG. 10 is an exploded view of an end part assembly of a battery cell provided by an embodiment of the present application from another angle of view.
Figure 11:
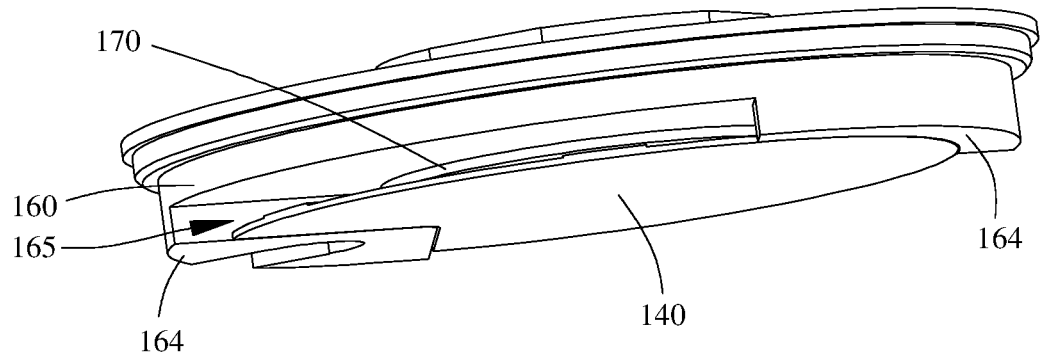
FIG. 11 is a schematic diagram of an avoiding portion and a welding portion of a battery cell provided by an embodiment of the present application.

In some embodiments, as shown in FIG. 10 and FIG. 11, a second boss 164 is formed on one side of the insulating piece 160 facing towards the electrode assembly 120, and the second boss 164 is configured to abut against the electrode assembly 120; and the second boss 164 abuts against the electrode assembly 120, so that shaking of the electrode assembly 120 can be avoided.

In some embodiments, referring to FIG. 10 and FIG. 11, a plurality of second bosses 164 are formed on one side of the insulating piece 160 facing towards the electrode assembly 120, thereby increasing contact surfaces with the electrode assembly 120 and facilitating multi-point abutting against the electrode assembly 120.

In some embodiments, referring to FIG. 10 and FIG. 11, the plurality of second bosses 164 are arranged at the periphery of the current collector 140 at intervals, a clearance portion 165 is formed between two adjacent second bosses 164, and at least part of the welding portion 170 is located in the clearance portion 165. Through the arrangement of the clearance portion 165 between the second bosses 164, laser can penetrate from the clearance portion 165 or the welding head can extend into the clearance portion 165 to weld the current collector 140 and the electrode terminal 130.

In one embodiment, as shown in FIG. 10, the insulating piece 160 is provided with two second bosses 164, and the two second bosses 164 form two clearance portions 165, so that the current collector 140 and the electrode terminal 130 are welded conveniently from two directions.

In some embodiments, as shown in FIG. 10 and FIG. 5, the end cover 150 is provided with a first liquid injection hole 152, where an avoiding groove 1641 is formed on an end face of one of the second bosses 164, the avoiding groove 1641 extends to an external peripheral surface of the second boss 164, a second liquid injection hole 1642 is formed on a bottom surface of the avoiding groove 1641, and the second liquid injection hole 1642 communicates with the first liquid injection hole 152.

When electrolyte is injected from the first liquid injection hole 152 of the end cover 150, the electrolyte can flow to the avoiding groove 1641 through the second liquid injection hole 1642, can flow to the external peripheral surface of the second boss 164 through the avoiding groove 1641, and then flows to a gap between the electrode assembly 120 and the shell 110, thereby increasing the flow velocity of the electrolyte and improving the liquid injection efficiency. The arrangement of the avoiding groove 1641 prevents the end part of the second liquid injection hole 1642 from directly abutting against the electrode assembly 120, so that the electrolyte flows smoothly.

It should be noted that the avoiding groove 1641 is formed on the end face of the second boss 164 facing towards the current collector 140.

In some embodiments, in order to prevent dust and other impurities from entering the shell 110, the battery cell 100 further includes a sealing cover (not shown in the figure), and the sealing cover is configured to block the first liquid injection hole 152, so that an accommodating space 111 of the shell 110 and the end cover 150 are sealed.

Figure 12:
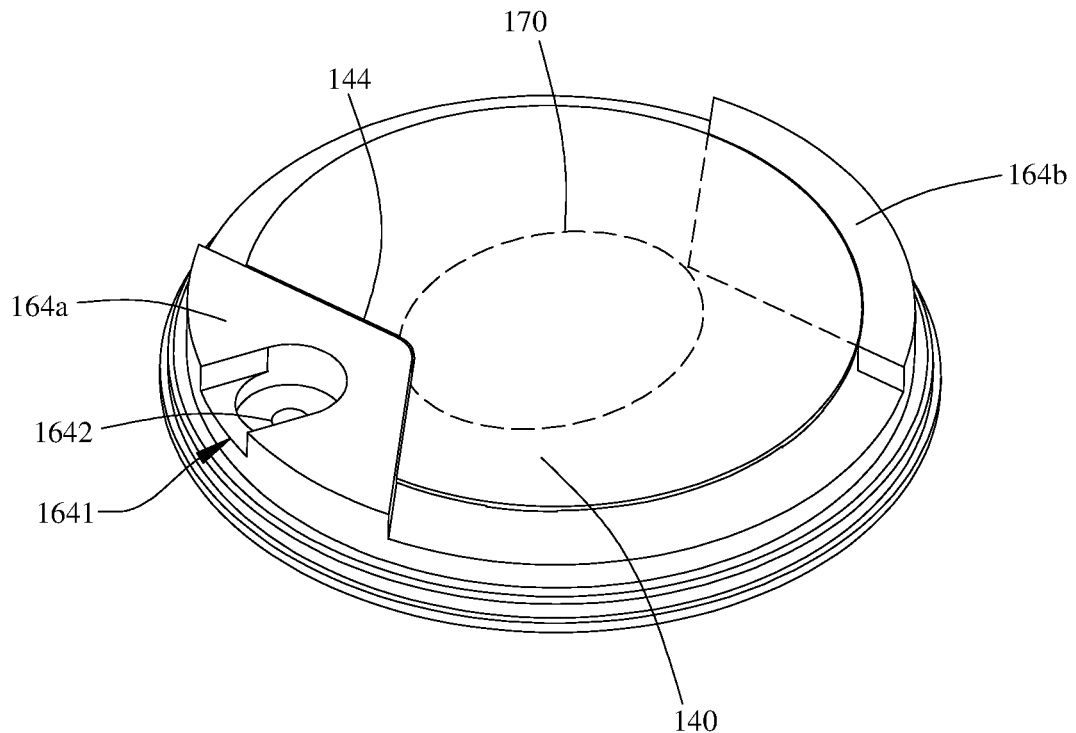
FIG. 12 is an assembling schematic diagram of a notch of a current collector and a second boss of an insulating piece provided by an embodiment of the present application.
Figure 13:
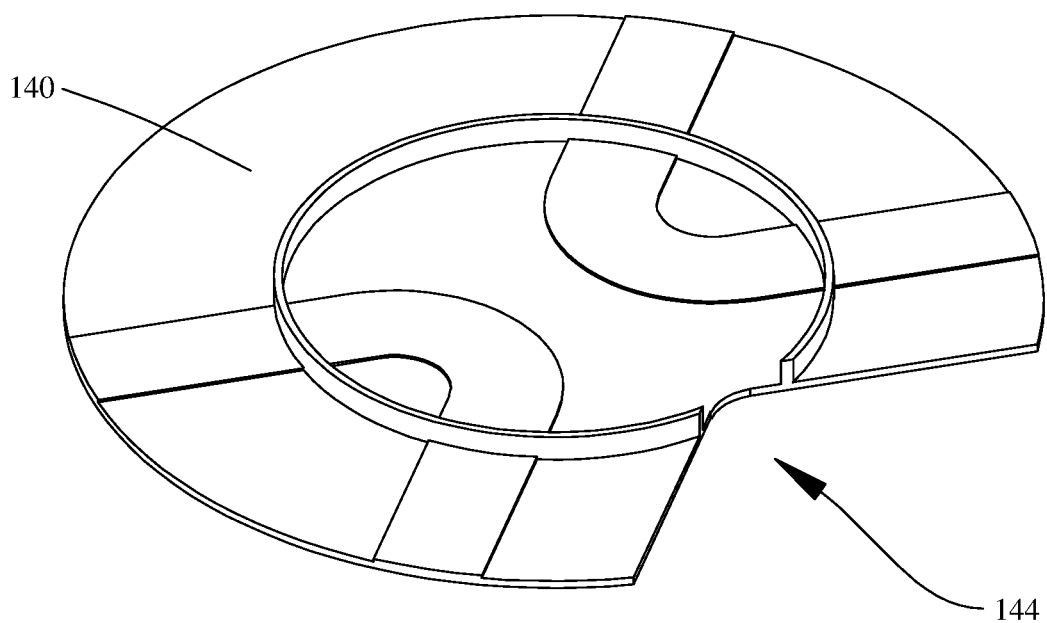
FIG. 13 is a schematic diagram of a notch of a current collector of a battery cell provided by an embodiment of the present application.

In some embodiments, as shown in FIG. 10, FIG. 12 and FIG. 13, a notch 144 is formed on the edge of the current collector 140, the plurality of second bosses 164 have a second boss 164a corresponding to the notch 144 of the current collector 140, a contour shape of the second boss 164a is matched with the notch 144, and the second boss 164a is clamped with the notch 144 so as to limit rotation of the current collector 140. The number of the second boss 164a is at least one, which is not limited in the present application. A shape of the notch 144 can be any appropriate form, such as a V shape, a U shape, concave shape, and the like.

In some embodiments, a shape of the notch 144 may be matched with shapes of other second bosses.

In some embodiments, as shown in FIG. 10, a limiting portion 133 is formed on the edge of the electrode terminal 130, the limiting portion 133 corresponds to the notch 144, and the limiting portion 133 is matched with the contour of the second boss 164a, the limiting portion 133 cooperating with the second boss 164a may prevent rotation of the electrode terminal 130 and improve the assembling stability.

In some embodiments, as shown in FIG. 10, in the plurality of second bosses 164, except for the second boss 164a corresponding to the notch 144, other second bosses 164b are of arc-shaped structures and are distributed in the circumferential direction of the current collector 140, an internal peripheral surface of the second boss 164b is matched with an edge contour of the current collector 140, and the second boss 164b cooperates with the second boss 164a to position the current collector 140.

In some embodiments, as shown in FIG. 10 and FIG. 12, on the basis that the second boss 164a has larger area in a radial direction of the current collector 140 relative to other second bosses 164b, the second liquid injection hole 1642 is formed in the second boss 164a.

In one embodiment, as shown in FIG. 10 and FIG. 12, the current collector 140 may be of a disk structure, two end faces of the second boss 164 in the circumferential direction of the current collector 140 extend towards the terminal pedestal 132 and are arranged in an included angle, and the included angle of the two end faces is an obtuse angle, so that laser can enter the clearance portion 165 or the welding head can extend into the clearance portion 165 conveniently, and a length of the welding portion 170 is increased.

As shown in FIG. 12, when the distance between the second boss 164 and a welding part (that is, a part before the welding portion 170 is formed) of the terminal pedestal 132 and the current collector 140 is larger, the intersection of the extension surfaces of the two end faces of the second boss 164 is located between the second boss 164 and the welding part of the terminal pedestal 132 and the current collector 140. In this case, the continuity of the welding portion 170 extending in the circumferential direction of the terminal pedestal 132 can be ensured.

Figure 14:
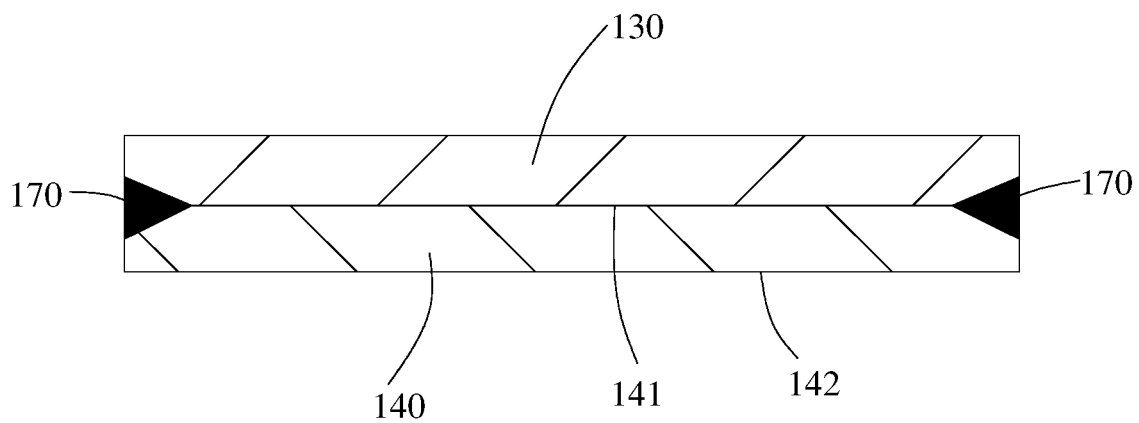
FIG. 14 is a schematic diagram of a welding portion of an embodiment for butt welding of an electrode terminal and a current collector of a battery cell provided by an embodiment of the present application.

In some embodiments, the welding portion 170 is exposed at the external peripheral surfaces of the current collector 140 and the electrode terminal 130. In addition to the above manner, the current collector 140 may also be attached to the electrode terminal 130. As shown in FIG. 14, the edge contour of the current collector 140 is matched with the edge contour of the electrode terminal 130, the first surface 141 of the current collector 140 is attached to the electrode terminal 130, the welding portion 170 is located at the attached joint of the current collector 140 and the electrode terminal 130, and the current collector 140 and the electrode terminal 130 are fixed at the attached joint in a butt welding manner. The first surface 141 is attached to the electrode terminal 130, thereby ensuring the welding reliability of the current collector 140 and the electrode terminal 130.

Figure 15:
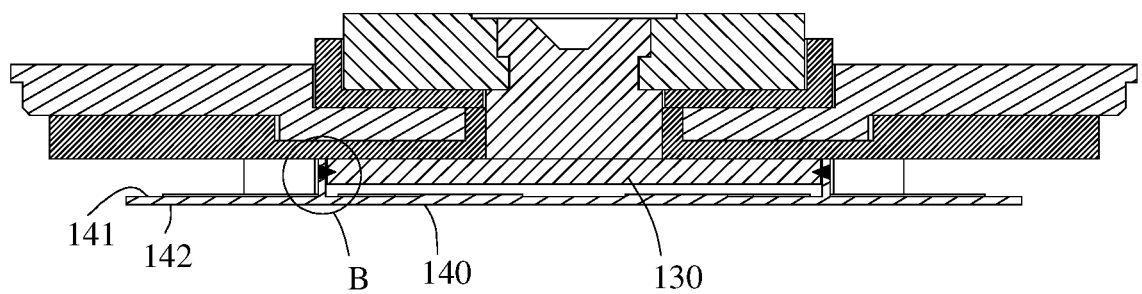
FIG. 15 is a schematic diagram of a welding portion for penetration welding of an electrode terminal and a current collector of a battery cell provided by an embodiment of the present application at an external peripheral surface of the current collector.
Figure 16:
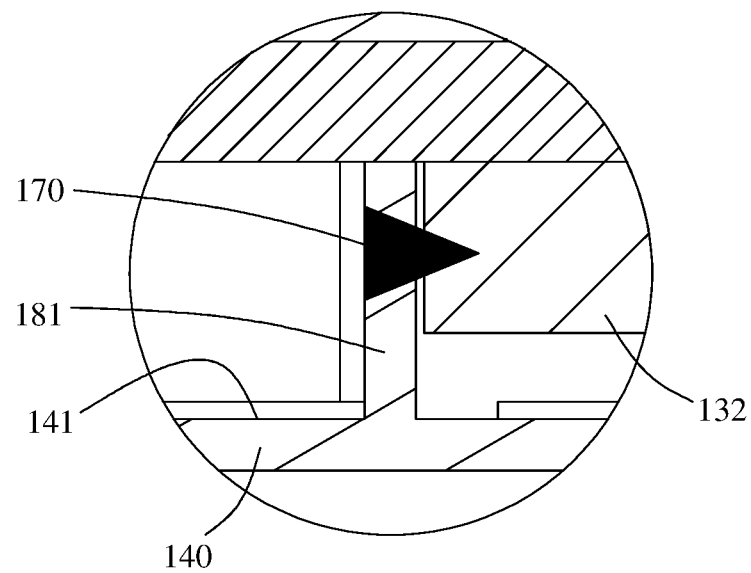
FIG. 16 is an enlarged view of a position B in FIG. 15.

In some embodiments, as shown in FIG. 15 and FIG. 16, the welding portion 170 may also be exposed at the external peripheral surface of the current collector 140, and the current collector 140 and the electrode terminal 130 may be welded at the external peripheral surface of the current collector 140 in a penetration manner. The current collector 140 includes a protrusion 181, the protrusion 181 is formed on the first surface 141, the protrusion 181 is protruded towards the electrode terminal 130 in the thickness direction of the current collector, the protrusion 181 is configured to be sleeved on the electrode terminal 130 (terminal pedestal 132), and the welding portion 170 is exposed on the side surface of the protrusion 181.

Figure 17:
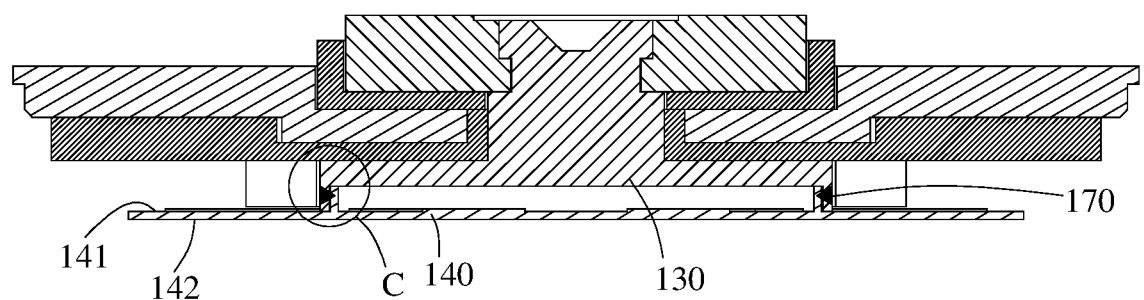
FIG. 17 is a schematic diagram of a welding portion for penetration welding of an electrode terminal and a current collector of a battery cell provided by an embodiment of the present application at an external peripheral surface of the electrode terminal.
Figure 18:
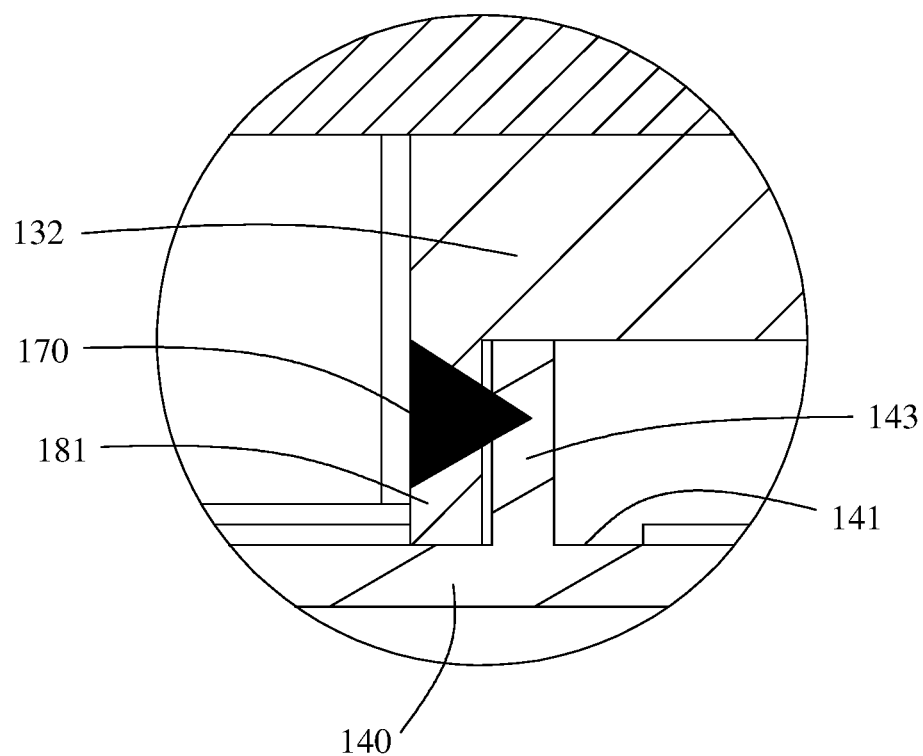
FIG. 18 is an enlarged view of a position C in FIG. 16.

In some embodiments, the welding portion 170 may also be exposed at the external peripheral surface of the electrode terminal 130, and the current collector 140 and the electrode terminal 130 may be welded at the external peripheral surface of the electrode terminal 130 in a penetration manner. As shown in FIG. 17 and FIG. 18, the electrode terminal 130 may be provided with a protrusion 181, and the protrusion 181 is configured to connect the current collector 140. For example, the protrusion 181 is formed on one surface of the terminal pedestal 132 closed to the current collector 140, and the protrusion 181 is protruded towards the current collector 140 in the thickness direction of the current collector 140; and a first boss 143 is formed on the first surface 141 of the current collector 140, the protrusion 181 is sleeved on the first boss 143, and the protrusion 181 and the first boss 143 are connected through the welding portion 170. That is, the electrode terminal 130 and the current collector 140 may be welded with the first boss 143 on the side surface of the protrusion 181 in a through welding manner, and the welding portion 170 is exposed on the side surface of the protrusion 181. It may be understood that the external peripheral surface of the protrusion 181 and the external peripheral surface of the current collector 140 (the external peripheral surface of the first boss 143) are connected through the welding portion 170. It should be noted that the external peripheral surface of the protrusion 181 is a side surface of the protrusion 181, which may be understood as a surface of the protrusion 181 in a direction perpendicular to the preset direction. When the protrusion 181 is formed on the electrode terminal 130, the side surface of the protrusion 181 may be understood as the external peripheral surface of the electrode terminal 130.

It should be noted that the protrusion 181 may abut against the first surface 141, but the first boss 143 is not in contact with the end face of the terminal pedestal 132 facing towards the current collector 140, so that the positioning of the electrode terminal 130 and the current collector 140 is realized; or the first boss 143 may abut against the end face of the terminal pedestal 132 facing towards the current collector 140, but the protrusion 181 is in not contact with the first surface 141, so that the positioning of the electrode terminal 130 and the current collector 140 is realized.

In some embodiments, as shown in FIG. 18, the first boss 143 is an annular boss. Due to the design of the annular boss, the weight of the current collector 140 can be reduced.

In some embodiments, a protrusion 181 is formed on one surface of the terminal pedestal 132 close to the current collector 140, a groove 182 may be formed at the peripheral edge of the current collector 140, the protrusion 181 is configured to be inserted into the groove 182, and the welding portion 170 is exposed at the external peripheral surfaces of the electrode terminal 130 and the current collector 140. The groove 182 can cooperate with the protrusion 181, thereby facilitating the butt welding of the electrode terminal 130 and the current collector 140 at the junction of the protrusion 181 and the groove 182.

Figure 19:
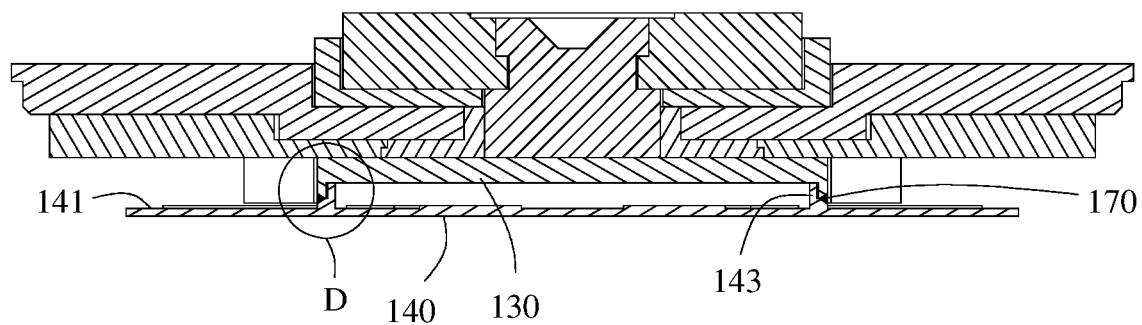
FIG. 19 is a schematic diagram of a welding portion of another embodiment for butt welding of an electrode terminal and a current collector of a battery cell provided by an embodiment of the present application.
Figure 20:
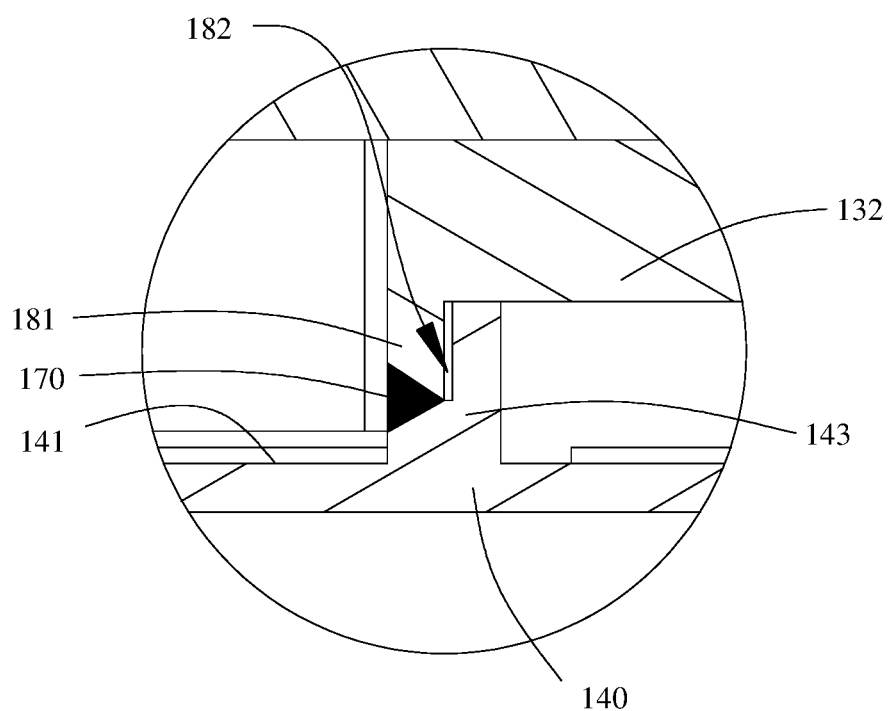
FIG. 20 is an enlarged view of a position D in FIG. 19.

In some embodiments, as shown in FIG. 19 and FIG. 20, a groove 182 may be formed at the peripheral edge of the first boss 143, the protrusion 181 is configured to be inserted into the groove 182, and the welding portion 170 is exposed at the external peripheral surfaces of the electrode terminal 130 and the current collector 140.

In some embodiments, the above-mentioned protrusion 181 may be an annular protrusion. Due to the arrangement of the annular protrusion, position accuracy of the current collector 140 and the electrode terminal 130 can be ensured, the length of the welding portion 170 can be increased in the same time, and firm connection between the current collector 140 and the electrode terminal 130 can be ensured. The side surface of the annular protrusion is the external peripheral surface of the annular protrusion.

It should be noted that the end part assembly may be an end part assembly applied to a positive electrode and/or an end part assembly applied to a negative electrode.

The electric apparatus and the battery 10 in the embodiments of the present application are described above. A manufacturing method of a battery cell in the embodiments of the present application will be described below. The parts which are not described in detail may be referenced to the foregoing embodiments.

The present application further provides a manufacturing method of a battery cell. The manufacturing method of the battery cell includes:

As shown in FIG. 21, welding the current collector 140 and the electrode terminal 130 from the circumferential direction of the electrode terminal 130, so that the electrode terminal 130 and the welding portion 170 of the current collector 140 are exposed at the external peripheral surface of the electrode terminal 130 and/or an external peripheral surface of the current collector 140.

It should be noted that welding from the periphery of the electrode terminal 130 refers to welding the electrode terminal 130 and the current collector 140 from the outer side surface of the electrode terminal 130 in the radial direction towards the direction of the center line of the terminal body 131. The outer side surface of the electrode terminal 130 refers to the external peripheral surface of the electrode terminal 130.

In some embodiments, before welding the electrode terminal 130 and the current collector 140, the manufacturing method of a battery cell further includes: assembling the electrode terminal 130, the end cover 150 and the insulating piece 160 integrally to form the end part assembly, and the end cover 150 is configured to seal an opening of the shell 110.

In some embodiments, before welding the electrode terminal 130 and the current collector 140, the manufacturing method of a battery cell further includes: attaching the second surface 142 of the current collector 140 and the electrode assembly 120, and welding the current collector 140 and the electrode assembly 120.

In some embodiments, the manufacturing method of a battery cell further includes: injecting electrolyte into the shell 110. The electrolyte flows into the shell 110 from the first liquid injection hole 152 on the end cover 150, the second liquid injection hole 1642 on the insulating piece 160 and the avoiding groove 1641. After injecting the electrolyte, the first liquid injection hole 152 is sealed, so that the end cover 150 and the shell 110 form a sealed space.

It should be noted that the features in the embodiments of the present application may be combined with each other in a non-conflicting situation.

The foregoing is merely illustrative of the preferred embodiments of the present application and is not intended to limit the present application, and various changes and modifications may be made in the present application by those skilled in the art. Any modifications, equivalent substitutions, improvements and the like made within the spirit and scope of the present application should be included within the protection scope of the present application.

What is claimed is:

1. A battery cell, comprising:
    an electrode assembly;
    an end cover, mounted on an electrode terminal;
    the electrode terminal;
    a current collector, configured to connect the electrode assembly and the electrode terminal; and
    an insulating piece, at least partially arranged between the end cover and the electrode terminal, the insulating piece extends between the end cover and the current collector, and is configured to isolate the end cover from the electrode terminal;
    wherein the current collector and the electrode terminal are connected through a welding portion, and the welding portion is exposed at an external peripheral surface of the current collector and/or an external peripheral surface of the electrode terminal;
    second bosses are formed on one side, towards the electrode assembly, of the insulating piece, the second bosses are configured to abut against the electrode assembly, a plurality of the second bosses are arranged at the periphery of the current collector at intervals, and a clearance portion is formed between two adjacent second bosses.

2. The battery cell according to claim 1, wherein one of the current collector or the electrode terminal is provided with a protrusion, the protrusion is configured to be connected to the other one of the current collector or the electrode terminal, and the protrusion and the external peripheral surface of the other one are connected through the welding portion.

3. The battery cell according to claim 2, wherein the welding portion is exposed at a side surface of the protrusion.

4. The battery cell according to claim 2, wherein a groove is formed on the external peripheral surface of the other one at one end, and the protrusion is configured to cooperate with the groove.

5. The battery cell according to claim 2, wherein the protrusion is an annular protrusion, and the annular protrusion is configured to be sleeved on the other one of the current collector and the electrode terminal.

6. The battery cell according to claim 2, wherein the current collector comprises a first surface and a second surface which are opposite to each other, the protrusion is formed on the first surface, and the second surface is configured to be attached to the electrode assembly.

7. The battery cell according to claim 6, wherein a gap is formed between the electrode terminal and the first surface.

8. The battery cell according to claim 2, wherein the current collector comprises a first surface and a second surface which are opposite to each other, a first boss is formed on the first surface, the second surface is attached to the electrode assembly, the protrusion is formed on one surface, close to the current collector, of the electrode terminal, the protrusion is sleeved on the first boss, and the protrusion and the first boss are connected through the welding portion.

9. The battery cell according to claim 8, wherein the first boss is an annular boss.

10. The battery cell according to claim 1, wherein a notch is formed at an edge of the current collector, and at least one of the second bosses is clamped with the notch to limit rotation of the current collector.

11. The battery cell according to claim 1, wherein the end cover is provided with a first liquid injection hole, an avoiding groove is formed on an end face of one of the second bosses, the avoiding groove extends to an external peripheral surface of the one of the second bosses, a second liquid injection hole is formed on a bottom surface of the avoiding groove, and the second liquid injection hole communicates with the first liquid injection hole.

12. A battery, comprising the battery cell as defined in claim 1.

13. An electric apparatus, comprising the battery as defined in claim 12.

14. A manufacturing method of a battery cell, the manufacturing method comprising:
    welding a current collector and an electrode terminal from a periphery of the electrode terminal, so that a welding portion of the electrode terminal and the current collector is exposed at an external peripheral surface of the electrode terminal and/or an external peripheral surface of the current collector;
    assembling the electrode terminal, an end cover and an insulating piece to form an end part assembly, the end cover mounted on the electrode terminal, at least partially the insulating piece arranged between the end cover and the electrode terminal, the insulating piece extends between the end cover and the current collector, and is configured to isolate the end cover from the electrode terminal;
    wherein second bosses are formed on one side, towards the electrode assembly, of the insulating piece, the second bosses are configured to abut against the electrode assembly, a plurality of the second bosses are arranged at the periphery of the current collector at intervals, and a clearance portion is formed between two adjacent second bosses.

\* \* \* \* \*